(12) United States Patent
Feng et al.

(10) Patent No.: US 9,076,146 B2
(45) Date of Patent: Jul. 7, 2015

(54) PERSONAL CUSTOMER CARE AGENT

(75) Inventors: Junlan Feng, Basking Ridge, NJ (US); Srinivas Bangalore, Morristown, NJ (US); Michael James Robert Johnston, New York, NY (US); Taniya Mishra, New York, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 564 days.

(21) Appl. No.: 12/905,172

(22) Filed: Oct. 15, 2010

(65) Prior Publication Data

US 2012/0095861 A1  Apr. 19, 2012

(51) Int. Cl.
G06Q 30/00 (2012.01)
G06Q 10/00 (2012.01)
G06Q 30/02 (2012.01)
G06Q 30/06 (2012.01)

(52) U.S. Cl.
CPC ............. G06Q 30/00 (2013.01); G06Q 10/00 (2013.01); G06Q 30/014 (2013.01); G06Q 30/0282 (2013.01); G06Q 30/0631 (2013.01)

(58) Field of Classification Search
CPC .......... G06Q 30/0282; G06Q 30/0601; G06Q 30/0631
USPC ....................................... 705/26.1, 26.7, 347
See application file for complete search history.

(56) References Cited

U.S. PATENT DOCUMENTS

| | | | |
|---|---|---|---|
| 6,981,040 B1 * | 12/2005 | Konig et al. | 709/224 |
| 7,103,165 B2 | 9/2006 | Baniak et al. | |
| 7,293,019 B2 * | 11/2007 | Dumais et al. | 707/754 |
| 7,809,709 B1 * | 10/2010 | Harrison, Jr. | 707/707 |
| 8,171,128 B2 * | 5/2012 | Zuckerberg et al. | 709/224 |
| 8,385,532 B1 * | 2/2013 | Geist et al. | 379/265.03 |
| 2001/0048738 A1 | 12/2001 | Baniak et al. | |
| 2002/0107830 A1 * | 8/2002 | Nanja | 707/1 |
| 2005/0160014 A1 * | 7/2005 | Moss et al. | 705/26 |
| 2007/0047714 A1 | 3/2007 | Baniak et al. | |
| 2008/0040474 A1 * | 2/2008 | Zuckerberg et al. | 709/224 |
| 2008/0103907 A1 * | 5/2008 | Maislos et al. | 705/14 |
| 2009/0046584 A1 * | 2/2009 | Garcia et al. | 370/233 |
| 2010/0082780 A1 * | 4/2010 | Muilenburg et al. | 709/221 |

(Continued)

FOREIGN PATENT DOCUMENTS

WO  WO-2007/030513 A2 *  3/2007

OTHER PUBLICATIONS

McCormick, J., "Feed Yourself a Helping of RSS," Government Computer News, vol. 24, No. 27, p. 37, Sep. 12, 2005.*

(Continued)

Primary Examiner — Nicholas D Rosen
(74) Attorney, Agent, or Firm — Greenblum & Bernstein, P.L.C.

(57) ABSTRACT

Aggregating information includes configuring, by at least one processor, a user profile that indicates user preferences for aggregated information. The at least one processor monitors information sources including the World Wide Web, business websites of interest, and online social media, based on the user preferences. Data obtained from the information sources is presented, based on the monitoring, by the at least one processor, in accordance with a presentation format, as the aggregated information, based on the user preferences. The at least one processor triggers updating of the presented aggregated information based on a change to the data at least one of the information sources and a change to the user profile.

20 Claims, 8 Drawing Sheets

(56) References Cited

U.S. PATENT DOCUMENTS

| | | | | |
|---|---|---|---|---|
| 2010/0094707 A1* | 4/2010 | Freer | ............................ | 705/14.54 |
| 2011/0113027 A1* | 5/2011 | Shen et al. | ..................... | 707/723 |
| 2011/0173076 A1* | 7/2011 | Eggleston et al. | .......... | 705/14.66 |
| 2011/0264528 A1* | 10/2011 | Whale | .......................... | 705/14.58 |
| 2012/0079004 A1* | 3/2012 | Herman | ......................... | 709/203 |
| 2012/0096041 A1* | 4/2012 | Rao et al. | ....................... | 707/794 |

OTHER PUBLICATIONS

Anon., "Facebook Launches Additional Privacy Controls for News Feed and Mini-Feed; Facebook Responds to User Feedback and Reaffirms Privacy as Top Priority," Business Wire, Sep. 8, 2006.*

Anon., "How to . . . Subscribe to an RSS Reader," PR News, vol. 64, No. 30, Aug. 4, 2008.*

Anon., "2004 Top 100 Sites You Didn't Know You Couldn't Live Without," PC Magazine, vol. 23, No. 7, p. 85, Apr. 20, 2004.*

Anon., "Web Sites," South Florida Sun-Sentinel, Broward Metro edition, Business and Technology section, p. 3E, Aug. 7, 2005.*

Pikas, C.K., "Blog Searching for Competitive Intelligence, Brand Image, and Reputation Management," vol. 29, No. 4, p. 16 (Jul. 2005-Aug. 2005).*

U.S. Appl. No. 12/901,075 to Srinivas Bangalore et al., filed Oct. 8, 2010.

U.S. Appl. No. 12/985,569 to Paul G. Baniak et al., filed Jan. 6, 2011.

* cited by examiner

| ENTITIES | Clothing Company Alpha       Clothing Company Beta         Clothing Company Gamma
|          | Electronics Company Alpha    Electronics Company Beta
|          | Electric Utility Company     Sewage Utility Company       Water Utility Company   Telephone Utility Company
|          | Cellular Phone Service Company  Internet Service Company  Cable Service Company
|          | Mortgage Company             Life Insurance Company       Home Insurance Company |
|---|---|
| INFORMATION SOURCES | Entity Websites, CNN News Website, BBC News Website, Twitter Social Networking Media, Facebook Social Networking Media |
| FUNCTIONS | Search, Track, Alert, Transaction Mining |
| OPTIONS | Search              Alpha AX310 Camera, Beta BX410 Software Patch
|         | Track               Price of AX310 Camera, Price of Gucci Coat, Sale history for Clothing Company Gamma
|         | Alert               Price of Gucci Coat Below $300, Home Insurance Payment Past Due, Mortgage Bill Due
|         | Alert Type          Email, Text Message
|         | Transaction Mining  Credit Card Details, Payment Due Date, Shipping Address, Shipping Method, Alert Type |
| CUSTOMER FULFILLMENT | Offer Sales/Deals based on Transaction Details
|                     | Pay Utility Bills through Service Companies and Insurance Companies |
| INTERFACE | Speech-to-text interface, natural language interface |
| DATA PRESENTATION ORDER | Any |

Figure 3

| ENTITIES | Mortgage Company Life Insurance Company Home Insurance Company<br>Computer Company Alpha Computer Company Beta<br>Electric Utility Company Sewage Utility Company Water Utility Company<br>Telephone Utility Company |
|---|---|
| INFORMATION SOURCES | Entity Websites, Washington Post News Website, Twitter Social Networking Media, MySpace Social Networking Media, Question and Answer Communities, Communities of Interest |
| FUNCTIONS | Question and Answer, Alert, Track, Publish |
| OPTIONS | Question and Answer "How do I fix a bug in Windows Vista Operating System?"<br>Alert Life Insurance Premium Payout, Computer Company Beta Product Launch<br>Alert Type Text message<br>Track QA Communities for answer to previous question<br>Publish Twitter, Communities of Interest, Email |
| CUSTOMER FULFILLMENT | Machine Learn Alert Topics |
| INTERFACE | None |
| DATA PRESENTATION ORDER | Entity Website, Communities of Interest, Question and Answer Communities, Washington Post News Website, Twitter Social Networking Media, MySpace Social Networking Media |

Figure 4 www.alphaelectronics.com/cameras
Product    Point and Shoot Camera    Serial No.    1235
Model No   AX310                     Pixels        7MP
   ......
                                                              400 www.bbcnews.com/newestproductreleases
Debut of the AX310 Point-and-Shoot Camera
By Jilly B. Duagaddi
     A long-awaited product has hit the market today, Alpha Electronics, Co. announced 400,000
                              .........
                                                              502

@iloverottweilers: I'm on the waiting list for the new AX310, does anyone know where I can get it now?
@shutterbug:  Try BestBuy, if not Alpha Electronics, Co. brick and mortar stores, shouldn't be hard to
get, I heard they shipped out 400,000 units domestically
                              .........                       504

Google Group
     Thread #1 Guy1: Hey does anyone know when the BX410 Software Patch is coming out?
                 Girl1: It's not slated to come out until July 17, 2010 and there have been
                 major production issues...you can get a workaround here: www.ace.com
                              .........                       506

Track Price of Gucci Coat
     Today's Price        June 12, 2010        $800    Price Change $199
     Yesterday's Price    June 11, 2010        $800    Price Change $0
     Last Price Change    March 2, 2010        $999    Price Change $200
     First Price          January 18, 2010     $1199   Price Change $0        508

Track Price of AX310
     July 15, 2010    $799    Price Change $0
                              .........                       510

Sale History for Clothing Company Gamma
     June 1, 2010 to June 15, 2010       20% of Pants
     March 15, 2010 to March 30, 2010    Buy one get one free dresses
     February 18, 2010                   Free accessory with purchase
                              .........                       512

Home Insurance Payment ALERT!!!!!!!!!
     Your Home Insurance Payment was due on July 1, 2010. You are past due. To pay your
     bill, visit the link below and bring your account up-to-date immediately!!!
                              .........                       514

Figure 5

ALERT!!!!! www.betacomputers.com/productlaunch
We are pleased to announce our super-slim 2.4 pound mega durable Beta DurathonPower Laptop. Built for the college student on the go, this powerhouse boasts 1GB of RAM,
......
600

ALERT!!!! www.washingtonpost.com/newestproductreleases
Debut of the Beta DurathonPower Laptop
By Kush S. Duagaddi
But will the battery life really last more than an hour or two? That remains the question on ever
.........
602

Track Most Recent Question: "How do I fix blurry Pictures"

July 15, 2010 Beta Computer Company FAQ
    Q: What should I do when my computer takes blurry pictures?
    A: We've developed a software patch so you do not have to change the mode upon start up each time. Please click here to download!

July 15, 2010 Google Group
    Thread #114 Guy1: Hey does anyone know why my nighttime pictures are blurred?
            Girl14: Try turning off the auto-night-tune mode, it seems to cause the pictures to overexpose and get blurry.

July 1, 2010 Google Group
    Thread #73  Girl5: Why can I not take any pictures that are not blurry?
            Girl3: I don't know I have the same problem. Adjusting the focus didn't help.

July 1, 2010 Twitter Social Media
    @iloveshoes: What do you think is wrong with 12picofus.jpg? Why does it look like that?
    @fixerupper: Did you try the auto-night-tune mode, or even changing the battery?

June 30, 2010 Beta Computer Company FAQ
    Q: What should I do when my computer takes blurry pictures?
    A: Try going to the night mode menu, and the selecting auto-night-tune mode. Make sure you always select the auto-night-tune-mode every time you turn on the camera.

June 9, 2010 Twitter Social Media
    @iloveshoes: What do you think is wrong with 12picofus.jpg? Why does it look like that?
    @fixerupper: Did you try the auto-night-tune mode, or even changing the battery?

PERSONAL CUSTOMER CARE AGENT

BACKGROUND

1. Field of the Disclosure

The present disclosure relates to aggregating information. More particularly, the present disclosure relates to updating aggregated information according to user preferences.

2. Background Information

A consumer may pay bills, issued by one or more companies, using the Internet. The consumer may wish to learn more about the products and services offered by these companies. To learn about new products and services, for example, a product that the consumer has not yet purchased, the consumer may receive advertisement information via emails, paper-based "circulars" and graphical popup windows delivered via an Internet browser. Further, in order to answer questions or troubleshoot issues the consumer may have with respect to a particular product or service, the consumer may place a telephone call or prepare an email to a customer service agent, retrieve and read a product manual or search the Internet using a search engine.

Each of these above-noted activities may be performed for each individual product or service requiring troubleshooting or requiring an answer to a question, using a system specific to each company. Similarly, the consumer may review the advertisement information received from each company in a number of different formats, each of which may be specific to the company. Accordingly, the consumer may interact with a number of different systems and websites specified by each of the companies in order to obtain the desired information.

BRIEF DESCRIPTION OF THE DRAWINGS

FIG. 5 shows an exemplary aggregated information display corresponding to the exemplary user profile shown in FIG. 3, according to an aspect of the present disclosure;

FIG. 6 shows an exemplary aggregated information display corresponding to the exemplary user profile shown in FIG. 4, according to an aspect of the present disclosure;

DETAILED DESCRIPTION

In view of the foregoing, the present disclosure, through one or more of its various aspects, embodiments and/or specific features or sub-components, is thus intended to bring out one or more of the advantages as specifically noted below.

According to an aspect of the present disclosure, a method of aggregating information includes configuring, by at least one processor, a user profile that indicates user preferences for aggregated information. The method includes monitoring, by the at least one processor, information sources comprising the World Wide Web, business websites of interest, and online social media, based on the user preferences. The method includes presenting data obtained from the information sources based on the monitoring, by the at least one processor, in accordance with a presentation format, as the aggregated information, based on the user preferences. The method also includes triggering, by the at least one processor, updating of the presented aggregated information based on a change to the data at least one of the information sources and a change to the user profile.

According to another aspect of the present disclosure, the method further includes publishing user comments, based on the user preferences, to at least one of the information sources.

According to yet another aspect of the present disclosure, the user preferences specify a product, a service, and a business.

According to still another aspect of the present disclosure, the aggregated information comprises recalls, price fluctuations and troubleshooting information related to a product specified in the user preferences.

According to an aspect of the present disclosure, the presentation format comprises at least one of: a dashboard utility, a report, a table, a summary and an email.

According to another aspect of the present disclosure, the user comments are converted from spoken comments to text using automated speech recognition.

According to yet another aspect of the present disclosure, the method includes obtaining transaction details for a user and using the transaction details to conduct an activity with respect to the information sources.

According to still another aspect of the present disclosure, the activity is a user activity, and the user activity is purchasing a product.

According to an aspect of the present disclosure, the activity is a user activity, and the user activity is paying a bill.

According to another aspect of the present disclosure, the activity is a system activity, and the system activity is displaying a price incentive.

According to yet another aspect of the present disclosure, the method includes automatically generating an email based on the user preferences.

According to still another aspect of the present disclosure, the method includes verifying the aggregated information based on consistency among the data, based the user preferences.

According to an aspect of the present disclosure, the method includes updating the user profile based on user activity information that is collected based on interaction with the information sources.

According to another aspect of the present disclosure, the user preferences specify the presentation format and search, track, question and answer, alert, transaction mining and publish functions.

According to yet another aspect of the present disclosure, the user profile is updated automatically.

According to still another aspect of the present disclosure, the user profile is updated in real-time.

According to an aspect of the present disclosure, the method includes answering a user query based on the aggregated information.

According to another aspect of the present disclosure, the aggregated information is presented to the user via a mobile device.

According to still another aspect of the present disclosure, a system for aggregating information includes a configurer, implemented on at least one node, that configures a user profile that indicates user preferences for aggregated information. The system includes a monitor, implemented on the at least one node, that monitors information sources comprising the World Wide Web, business websites of interest, and online social media, based on the user preferences. The system includes a presenter, implemented on the at least one node, that presents data obtained from the information sources based on the monitoring, by the at least one processor, in accordance with a presentation format, as the aggregated information, based on the user preferences. The configurer triggering updating of the presented aggregated information based on a change to the data at least one of the information sources and a change to the user profile.

According to yet another aspect of the present disclosure, at least one non-transitory computer readable medium stores a set of executable instructions for aggregating information, the set of executable instructions directing at least one processor to perform acts of: configuring, by at least one processor, a user profile that indicates user preferences for aggregated information. The acts include monitoring, by the at least one processor, information sources comprising the World Wide Web, business websites of interest, and online social media, based on the user preferences. The acts include presenting data obtained from the information sources based on the monitoring, by the at least one processor, in accordance with a presentation format, as the aggregated information, based on the user preferences. The acts include triggering, by the at least one processor, updating of the presented aggregated information based on a change to the data at least one of the information sources and a change to the user profile.

According to a non-limiting embodiment of the present disclosure, a personal customer care agent aggregates information about selected entities, from a number of information sources. The entities are any of the following, but not limited to: schools, organizations, retail companies, corporations, business-to-business companies, companies selling products and/or services, religious organizations, non-profit organizations, partnerships and governmental organizations. In one embodiment, the entities are selected, as user preferences, by a user and a user profile is configured to indicate the user-selected entities. In another embodiment, the entities and/or other user preferences are "learned" by the personal customer care agent and may be added to the user profile. The selected entities or the learned entities are representative of the user's interests. Exemplary entities include any of the following, but not limited to: utility companies (e.g., sewage, water, gas, electric, garbage removal, telephone), service offering companies (e.g., cable television providers, Internet service providers, satellite television providers, mobile phone service providers), home office supply companies, computer companies, insurance companies (e.g., life insurance, homeowners' insurance, dental insurance, vision insurance, pet insurance, medical insurance, malpractice insurance, liability insurance), clothing companies, automotive companies and universities.

The personal customer care agent aggregates information related to the selected entities from information sources including any of the following, but not limited to: websites for the selected entities or the learned entities (e.g., on the internet at att dot com, nyu dot edu, metlife dot com), at least one transaction node storing typical transaction details related to a transaction performed by the user with respect to a particular entity, social networking media websites (e.g., websites for LinkedIn™, Facebook™, Myspace™, Gowalla™, Foursquare™, Twitter™ and Friendster™), question and answer communities and communities of interest, news organization websites (e.g., websites for BBC America™, The Washington Post™, CNN™ and The New York Times™) and other information sources. Information obtained from the information sources may include audio, graphical, video, text and software content.

The aggregated information from the information sources is presented to the user via any of the following, but not limited to: a personal computing device (e.g., a notebook computer and a desktop personal computer) and a mobile device (e.g., data phone, cellular phone and Netbook). In one embodiment, the user specifies user preferences for obtaining and presenting the information, as well as generating and publishing information, in the user profile that is accessible by the personal customer care agent. In another embodiment, the personal customer care agent learns user preferences for obtaining and presenting the information, as well as generating and publishing information, based on user activity. In both embodiments, user preferences specify what kind of information is obtained, how it is obtained and how it is presented to the user.

Figure 1:
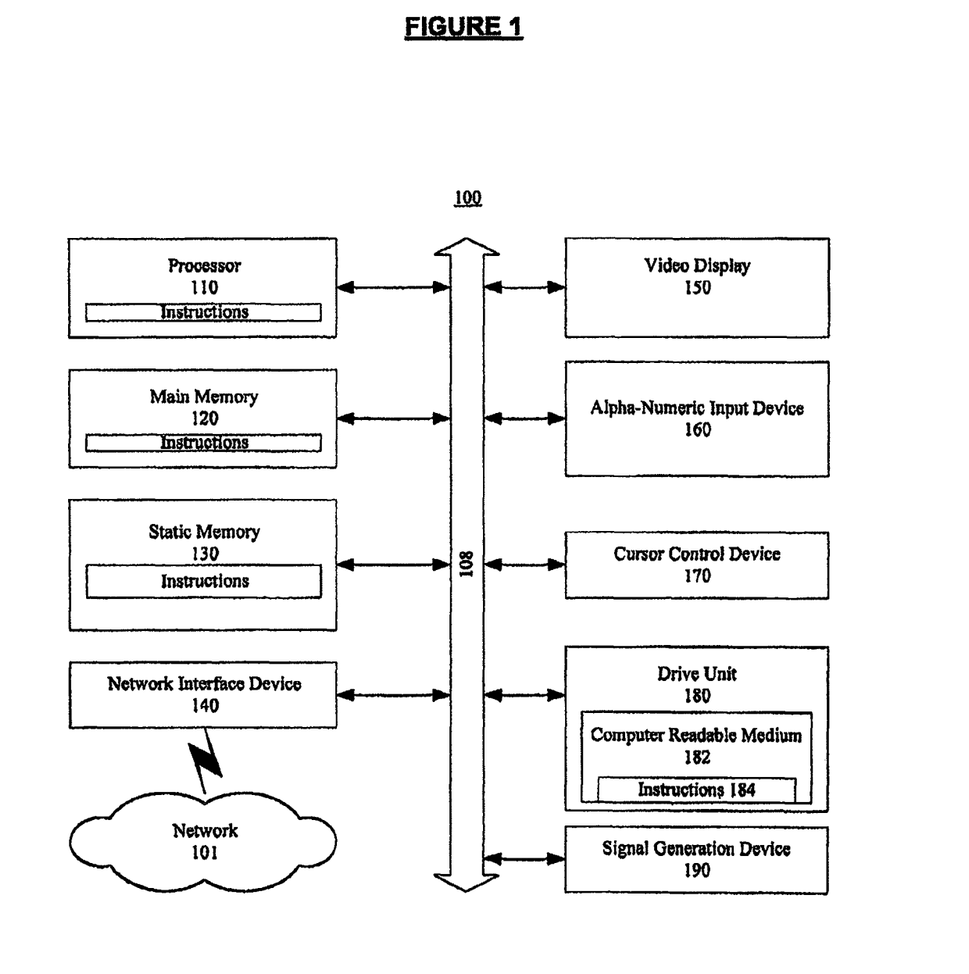
FIG. 1 shows an exemplary general computer system that includes a set of instructions for implementing a personal customer care agent, as described herein.

FIG. 1 is an illustrative embodiment of a general computer system that includes a set of instructions for implementing a personal customer care agent as described herein. The general computer system is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices. For example, the computer system 100 may include or be included within any one or more of the computers, servers, systems, or communication networks described herein.

In a networked deployment, the computer system may operate in the capacity of a server or as a client user computer in a server-client user network environment, or as a peer computer system in a peer-to-peer (or distributed) network environment. The computer system 100, or portions thereof, can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or subsystems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an alpha-numeric input device 160, such as a keyboard, another input device (not shown), such as a remote control device having a wireless keypad, a keyboard, a microphone coupled to a speech recognition engine, a camera such as a video camera or still camera, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
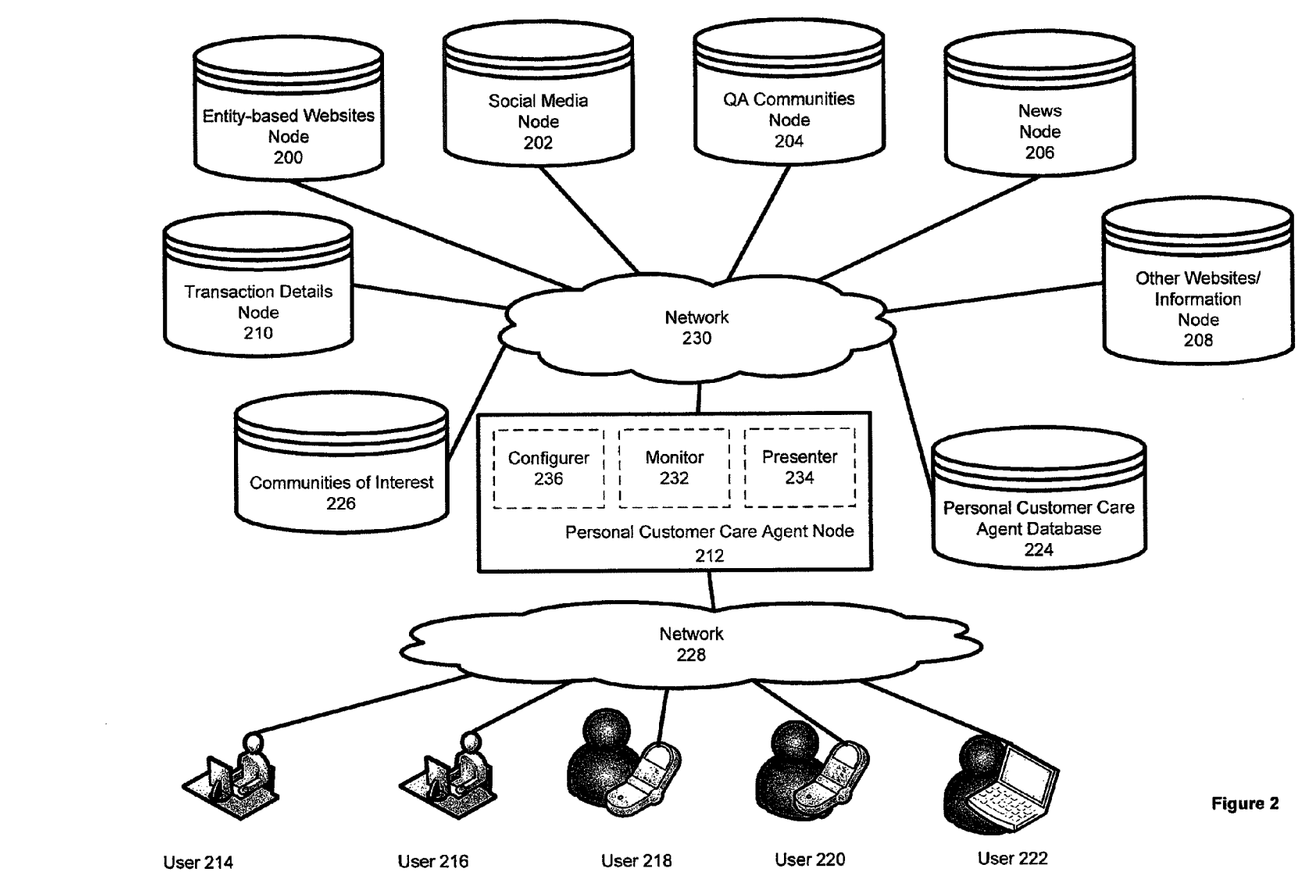
FIG. 2 shows an exemplary system incorporating a personal customer care agent node, according to an aspect of the present disclosure.

In FIG. 2, an exemplary system incorporating a personal customer care agent is shown. Personal customer care agent node 212 includes personal customer care agent software. A node is any of the following, but not limited to: a processor, a network element, a server, a computing device, a database, a hardware device, a physical storage and a physical memory. While shown as a single node in FIG. 2, personal customer care agent node 212 is implementable on one or more nodes. Further, although communities of interest node 226, transaction details node 210, entity-based websites node 200, social networking media node 202, question and answer communities node 204, news node 206, other websites/information node 208 are illustrated in FIG. 2 as being eight separate nodes, it is noted that one or more of the above-noted nodes are implementable on a single node. For example, each of the transaction details node 210 and the entity-based websites node 200 are implementable one or any number of nodes.

Moreover, although each of social networking media node 202, question and answer communities node 204, news node 206, other websites/information node 208 are illustrated in FIG. 2 as being eight separate nodes, it is noted that one or more of the above-noted nodes are implementable on two or more nodes. For example, entity-based websites node 200 may include a separate node for each entity (e.g., a church website node, an Internet service provider website node, a gas company website node).

The personal customer care agent node 212 is connected to communities of interest node 226, transaction details node 210, entity-based websites node 200, social networking media node 202, question and answer communities node 204, news node 206, other websites/information node 208 via network 230. It is understood that network 230 may be implemented by any telecommunications or data network(s) accessible by the user including, but not limited to: wide area networks (WANs), public switched telephone networks (PSTNs), asynchronous transfer mode (ATM) networks, and the Internet (using, for example, voice over interne protocol), without departing from the spirit and scope of the present disclosure. In one non-limiting embodiment, network 230 includes component networks that are heterogeneous to one another. In another non-limiting embodiment, each of the component networks are homogeneous with one another.

The personal customer care agent node 212 is also optionally connected to personal customer care agent database 224. In one embodiment personal customer care agent node 212 and personal customer care agent database 224 are implemented together. The personal customer care agent node 212 is also connected, via network 228, to user 214, user 216, user 218, user 220 and user 222. As will be understood by one of ordinary skill in the art, any number of users are connected to the personal customer care agent node 212. As discussed above, it is understood that network 228 may be implemented by any telecommunications or data network(s) accessible by the users including, but not limited to: wide area networks, public switched telephone networks, asynchronous transfer mode networks, and the Internet (using, for example, voice over interne protocol), without departing from the spirit and scope of the present disclosure.

While the personal customer care agent node 212 (implementing the personal customer care agent software) is shown in FIG. 2 as being accessible to the users via network 228, in one non-limiting embodiment, the personal customer care agent software is implementable on any of the following, but not limited to: a personal computing device, a mobile device and a mobile computing device. In another non-limiting embodiment, the personal customer care agent software is implementable on a tangible device maintained by one or more of the selected entities. In another non-limiting embodiment, the personal customer care agent software is implementable on a tangible device maintained by a third party other than the selected entities and the user.

The personal customer care agent node 212 includes a configurer 236, an monitor 232 and a presenter 234. Each of the configurer 236, the monitor 232 and the presenter 234 are implementable using any combination of software and hardware that is implemented on the personal customer care agent node 212. In one exemplary, non-limiting embodiment of the present disclosure, the configurer 236 is a software application that is implemented on a hardware portion of the personal customer care agent node 212, which is, for example, a database. In another exemplary, non-limiting embodiment of the present disclosure, the monitor 232 is implemented by operating system software and corresponding hardware upon which the operating system software acts, and the personal customer care agent 212 includes a processor that has, for example, three different operating systems running thereon. In yet another exemplary, non-limiting embodiment of the present disclosure, the presenter 234 uses only a portion of the hardware of the personal customer care agent node 212. In still another exemplary, non-limiting embodiment of the present disclosure, the hardware portion of the personal customer care agent node 212 is implemented by a network server and the monitor 232 uses a physical, hardware interface of the network server.

Figure 7:
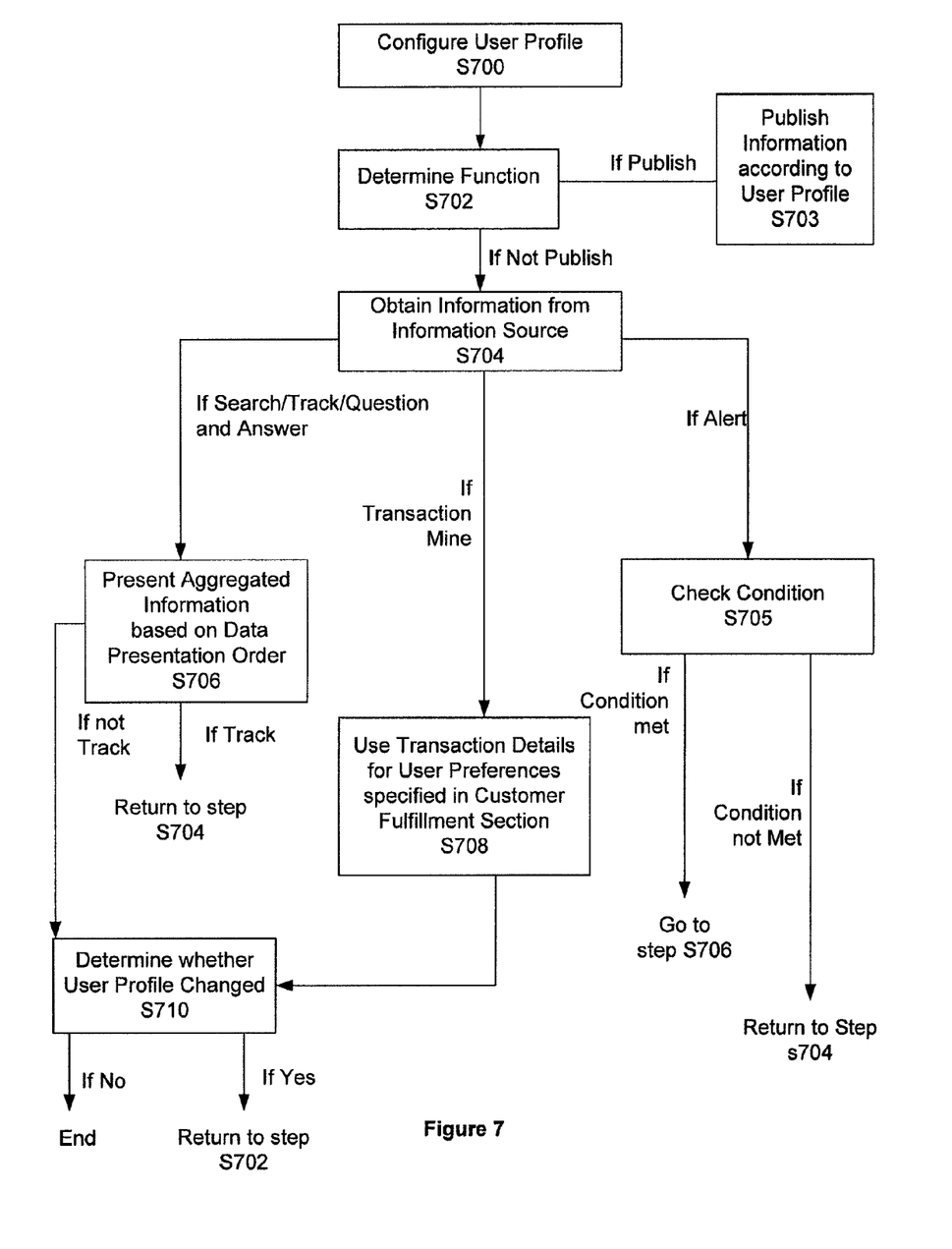
FIG. 7 shows an exemplary process flow diagram for presenting the aggregated information display to the user, according to an aspect of the present disclosure.

The configurer 236 configures a user profile that indicates user preferences for a user, in a process that is discussed in further detail with respect to FIG. 7. In one non-limiting embodiment of the present disclosure, the configurer 236 obtains user preferences from the personal customer care agent database 224 via the network 230. In another non-limiting embodiment of the present disclosure, the configurer obtains user preferences from users 214, 216, 218, 220 and 222 via the network 228. In yet another non-limiting embodiment of the present disclosure, the user profile is stored in the personal customer care agent database 224.

In one non-limiting embodiment of the present disclosure, the monitor 232 monitors and obtains data, based on the user preferences specified in the user profile, from information sources including communities of interest node 226, transaction details node 210, entity-based websites node 200, social networking media node 202, question and answer communities node 204, news node 206, other websites/information node 208 as illustrated in FIG. 2.

In another non-limiting embodiment of the present disclosure, the presenter 234 presents the data obtained by the monitor 232, in accordance with a presentation format, as aggregated information, based on the user preferences specified in the user profile. In yet another non-limiting embodiment of the present disclosure, the presenter 234 sends the aggregated information to one or more of users 214, 216, 218, 220 and 222 via the network 228. In one none-limiting embodiment of the present disclosure, the configurer 236 triggers updating of the presented aggregated information based on a change to one or more of the information sources information sources including communities of interest node 226, transaction details node 210, entity-based websites node 200, social networking media node 202, question and answer communities node 204, news node 206, other websites/information node 208, which is discussed in further detail with respect to FIG. 7. In another non-limiting embodiment of the present disclosure, the configurer 236 triggers an update of the presented aggregated information based on a change to the user profile, which is discussed in further detail with respect to FIG. 7.

Figure 3:
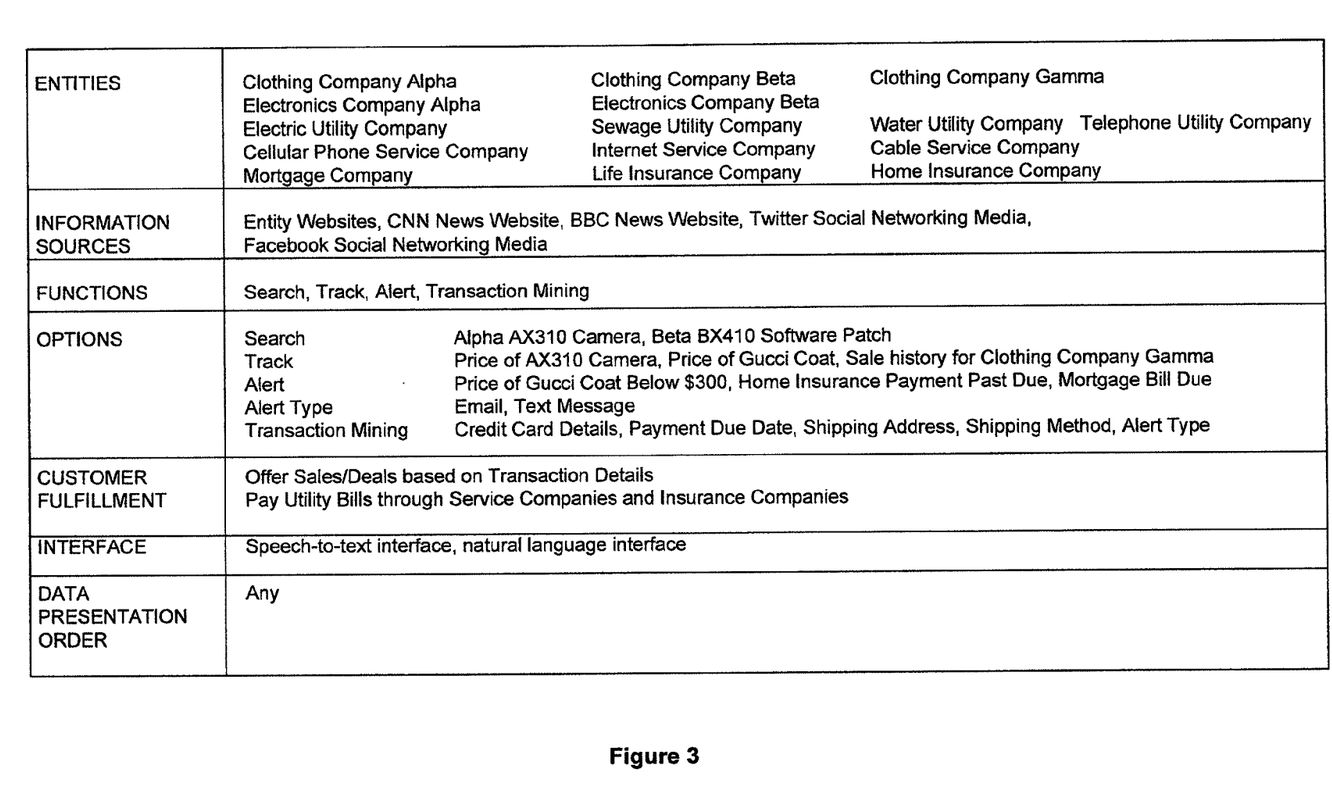
FIG. 3 shows an exemplary user profile, according to an aspect of the present disclosure.

In FIG. 3, an exemplary user profile is shown. The user selects as user preferences, entities including clothing company alpha, clothing company beta, clothing company gamma, electronics company alpha, electronics company gamma, electric utility company, sewage utility company, water utility company, telephone utility company, cellular phone service company, Internet service provider company, cable service company, mortgage company, life insurance company and home insurance company. Information from selected information sources about the above-noted entities is obtained and aggregated for presentation to the user. Information sources selected as user preferences for the exemplary user profile shown in FIG. 3 include websites specific to each of the above-noted companies (e.g., a website for the electric utility company, a website for the Internet service provider company and a website for the mortgage company), a website or other electronically accessible information source produced by CNN™ News, a website or, other electronically accessible information source produced by BBC™ News, the Twitter™ social networking media website, and the Facebook™ social networking media website.

The exemplary user profile shown in FIG. 3 specifies search, track, alert and transaction mining functions. These functions will be described in further detail below. The exemplary user profile also specifies an options section that includes at least one argument or condition for each of the selected functions. The user preferences specified in the exemplary user profile indicates that the user specified searching for an AX310 camera produced by electronics company alpha and a BX510 software patch produced by electronics company beta. That is, information from any of the above-noted information sources regarding either the Alpha AX310 camera and Beta BX510 software patch is obtained, aggregated and presented to the user. In one embodiment, executing the search function re-obtains information from information sources specified as user preferences in the user profile, when the user profile is updated, without requiring any action on the part of the user.

The track function is similar to the search function, except that any changes to the information obtained from the information source are updated, for example, periodically or in real-time, and presented to the user without requiring any action on the part of the user. In one embodiment, the user specifies a frequency for checking or polling the information sources for changes to the information. For example, the frequency may be hourly, daily, weekly, monthly or yearly. In another embodiment, an information source pushes changes to information, to the user. In another embodiment, an information source pushes changes to information, to the user or the personal customer care agent. In yet another embodiment, executing the track function re-obtains information, by the personal customer care agent, from information sources specified as user preferences in the user profile, when the user profile is updated, without requiring any action on the part of the user.

In the exemplary profile shown in FIG. 3, the price of the AX310 camera, the price of a Gucci™ coat, and sale history for clothing company gamma are tracked. Using the Gucci™ coat as an example, initially, the price of the Gucci™ coat is obtained from any of the information sources that have information regarding the price of the Gucci™ coat. Each time the price for the Gucci™ coat changes at one or more of the selected information sources, a tracking message is sent to at least one of a mobile device and a personal computing device for the user. In one embodiment, the tracking message includes all previously listed prices for the Gucci™ coat at each of the information sources that contain price information.

The alert function is similar to the track function, except that information regarding the alert topic specified as a user preference is not presented to the user until a condition is satisfied. In the exemplary user profile shown in FIG. 3, an alert is presented to the user when the price of the Gucci™ coat falls below $300 in the form of a text message or an email (i.e., the alert type). That is, if the price of the Gucci™ coat is $301 or any other dollar amount above $300, the price will not be presented to the user. Similarly, for the home insurance payment past due alert, if the home insurance payment due date is Jul. 1, 2010 and the current date is Jun. 30, 2010 or any other day on or before Jul. 1, 2010, then the home insurance payment past due alert will not be presented to the user since the condition has not yet been satisfied. A similar description applies to the mortgage bill due alert topic; if the mortgage bill is due on Jul. 1, 2010, then the user will be alerted of the same at predefined time intervals (e.g., daily or weekly) prior to the bill due date, but not after the mortgage bill due date (i.e., on or after Jul. 2, 2010).

Executing the transaction mining function obtains details of the user's transactions with one or more of the selected entities specified in the user profile. For example, if the user typically pays cellular phone service bills issued by the cellular phone service company via the Internet, then the cellular phone service company may obtain any of the following details about the transaction: date of payment, time of day making payment, credit card information, payment reminder alert type and website navigation information after paying the bill. As another example, the selected entity, clothing company beta, may store the following any of the following transaction details: shipping address, shipping method, credit card information, username, password, order status, replacement items and back order status. As will be understood by one of ordinary skill in the art, transaction details collected may differ among the selected entities.

While transaction details node 210 is shown in FIG. 2 as being distinct from the entity-based websites node 200, as will be understood by one of ordinary skill in the art, in one non-limiting embodiment, the personal customer care agent node obtains transaction details from the selected entities. Moreover, while transaction details node 210 is shown in FIG. 2 as being distinct from the personal customer care agent node 212, as will be understood by one of ordinary skill in the art, in another non-limiting embodiment, the personal customer care agent node obtains the transaction details from the user or from a personal computing device or a mobile device corresponding to the user.

The customer fulfillment section of the exemplary user profile shown in FIG. 3 specifies user preferences for presenting other sales and/or deals that are obtained from one or more of the selected entities based on collected transaction details. For example, if credit card information collected by clothing company beta indicates that the user is an American Express™ Black cardholder, then clothing company beta may display higher-end clothing to the user. As another example, clothing company beta may collaborate with electronics company alpha to present exclusive access to a waiting list for the AX310 camera, based on the user's credit card information and cardholder status. As yet another example, if the user uses GoogleCheckout™ to purchase a data-enabled cellular phone from the cellular phone service company, the user may also be presented with a discount for purchasing the data-enabled cellular phone or another product through the cellular phone service company.

In the exemplary user profile shown in FIG. 3, the customer fulfillment section also includes an option to pay bills for other companies while paying a bill for a service company (i.e., the cellular phone service company, the Internet service company and the cable service company in the exemplary user profile shown in FIG. 3) or an insurance company (i.e., the life insurance company or the home insurance company in the exemplary user profile shown in FIG. 3). For example, when paying a monthly cable service bill through the cable service company, the user will also be presented with options to pay the user's electric bill, sewage bill, water bill and/or telephone bill.

The interface section of the exemplary user profile shown in FIG. 3 specifies a speech-to-text interface and a natural language interface. The user may speak into a microphone or other audio equipment that is connected to the personal computing device or the mobile device. The speech is converted into text for performing any of the following, but not limited to: specifying user preferences for the user profile and configuring the personal customer care agent. The natural language interface is used, in one embodiment, to specify search queries in the user profile. In another non-limiting embodiment, a Boolean searching technique is used specify search queries in the user profile.

The data presentation order indicates that the information obtained from the information sources is presentable in any order, regardless of authenticity, reliability, date and time. In such case, the personal customer care agent selects an order or present the aggregated information randomly.

Figure 4:
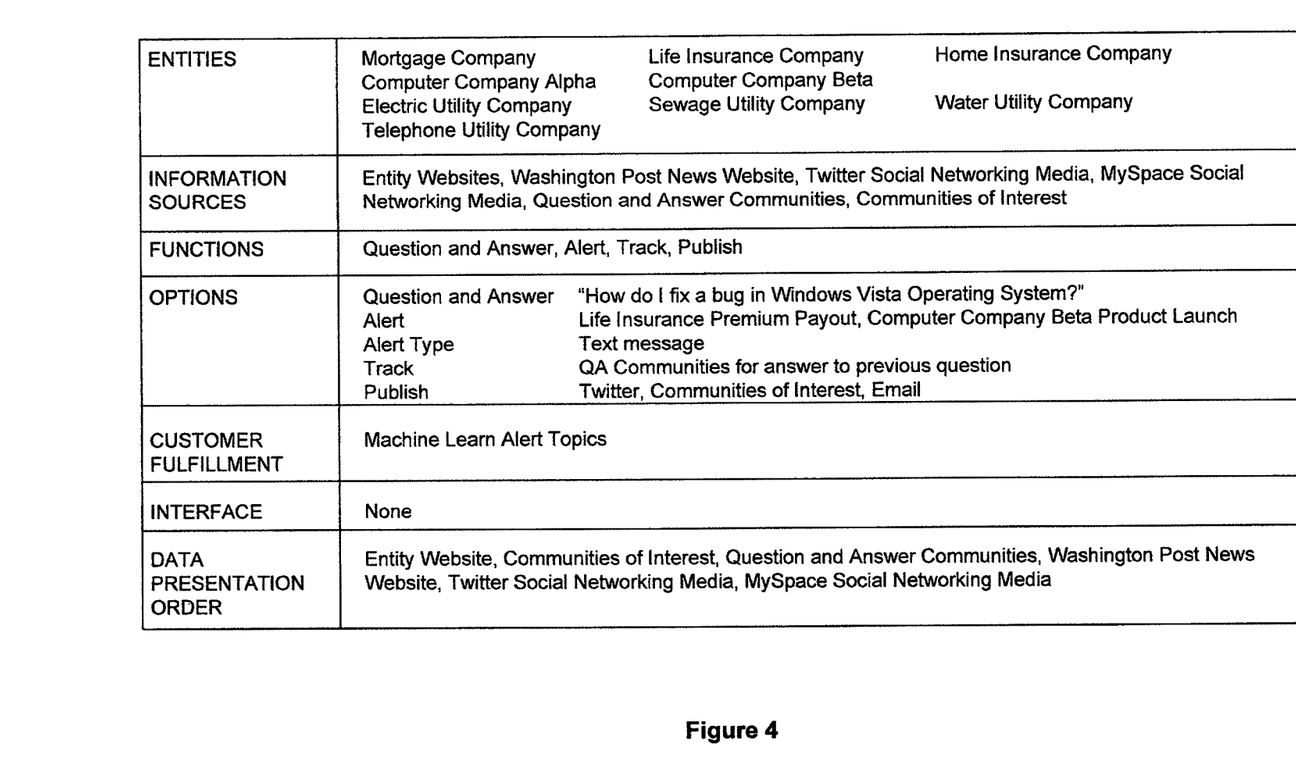
FIG. 4 shows an exemplary user profile, according to an aspect of the present disclosure.

In FIG. 4, another exemplary user profile is shown. The selected entities specified by the user include a mortgage company, a life insurance company, a home insurance company, computer company alpha, computer company beta, a electric utility company, a sewage utility company, a water utility company and a telephone utility company. Information from selected information sources about the above-noted entities is obtained and aggregated for presentation to the user. Information sources specified as user preferences for the exemplary user profile shown in FIG. 4 include websites specific to each of the above-noted companies (e.g., a website for the electric utility company, a website for computer company alpha and a website for the home insurance company), a website or other electronically accessible source for data produced by The Washington Post™, the Twitter™ social networking media website, and the Myspace™ social networking media website, question and answer communities, and communities of interest.

The exemplary user profile shown in FIG. 4 specifies question and answer, alert, track and publish functions. The exemplary user profile also specifies options that include at least one argument for each of the selected functions. The question and answer function enables a user to speak or type a question (i.e., "How do I fix a bug in the Windows™ Vista operating system?" in the exemplary user profile shown in FIG. 4) and the personal customer care agent obtains answers to this question from the information sources. For example, the website for the computer company alpha, the website for computer company beta and question and answer communities may contain potential answers to the above-noted question. Question and answer pairs may also be "mined" from any of the information sources. That is, the information source may be searched for the answer, if the question appears somewhere on the information source. For example, a Twitter™ post (i.e., a "tweet") may ask the above-noted question about fixing a bug in the Windows™ Vista operating system. However, the answer may not appear in an immediately subsequent posting. Rather, the answer may appear in a posting posted several days or weeks later. Therefore, the personal customer care agent mines the Twitter™ social networking media website to obtain the answer to the above-noted question.

The exemplary user profile shown in FIG. 4 is also configured by the user to present an alert when there is a life insurance premium payout by the life insurance company. Information regarding the alert topic specified as a user preference by the user is not presented to the user until a condition is satisfied. An alert is also presented when computer company beta launches a new product. The alert type specifies that the user configuring the exemplary user profile shown in FIG. 4 chooses to receives text message presenting the aggregated information. That is, information from any of the above-noted information sources regarding either the life insurance premium payout and the computer company beta product launch is obtained, aggregated and presented to the user. In the example presented in FIG. 4, it is unlikely that any information source other than the entity website for the life insurance company will contain information regarding a life insurance payout. In contrast, other information sources (aside from the entity website from computer company beta) may have information regarding the computer company beta product launch.

The track function is similar to the search function, as noted above, except that any changes to the information obtained from the information source are updated, for example, periodically or in real-time, and presented to the user without requiring any action on the part of the user. In one embodiment, the user specifies a frequency for checking or polling the information sources for changes to the information. For example, the frequency may be hourly, daily, weekly, monthly or yearly. In another embodiment, an information source pushes changes to the user. In the exemplary profile shown in FIG. 4, the QA communities are tracked for answers to the question, "How do I fix blurry pictures?". Each time answer is posted that answers this question, a message is presented to the user. In one embodiment, all previous answers are also presented. In another embodiment, an information source pushes changes to information, to the user or the personal customer care agent. In yet another embodiment, executing the track function re-obtains information, by the personal customer care agent, from information sources specified as user preferences in the user profile, when the user profile is updated, without requiring any action on the part of the user.

The publish function includes an argument specifying the information sources to which the user is able to publish information. In the exemplary user profile shown in FIG. 4, the user is able to publish comments to the Twitter™ social networking media website, communities of interest and email based on a tracked, searched for or alerted topic, a question or transaction detail. In a non-limiting embodiment, the user is presented with the option to email the question or comments to computer company alpha, computer company beta or The Microsoft, Corp™. In yet another non-limiting embodiment, the user publishes comments on the available answers to the user's question on the Twitter™ social networking website.

The customer fulfillment section specifies user preferences that allow the personal customer care agent to present additional alerts based on user history and user activity, i.e., "machine learning". In one non-limiting embodiment, details relating to the user history and the user activity are stored in the personal customer care agent database. In another non-limiting embodiment, machine learned alert arguments are not specified in the user profile. In yet another non-limiting embodiment, machine learned alert arguments are automatically added to the options section of a user profile.

The interface section shown in FIG. 4 specifies "none", indicating that no speech-to-text or natural language search options are available to the user.

The data presentation order section of the exemplary user profile shown in FIG. 4 specifies the order in which the information obtained from the information sources is presented. In one embodiment, the information sources are ordered based on a degree of relative reliability. For example, the website for computer company alpha is likely to be more reliable than the Twitter™ social networking media website regarding a product launch initiated by computer company alpha. In the exemplary user profile shown in FIG. 4, information regarding the options specified as user preferences obtained from the information sources are ordered by the website for an entity, communities of interest, question and answer communities, The Washington Post™ news website, the Twitter™ social networking media website and the Myspace™ social networking media website. For example, the alert for the computer company beta product launch would present the aggregated information in the following order: information from the computer company beta website, information from the PC online community of interest and information from The Washington Post™ news website. In this example, the question and answer communities do not have any information about the product insofar as the product was just launched and the product information may not have reached a requisite critical mass to have a following on the Twitter™ and Myspace™ social networking media websites.

In FIG. 5, an exemplary aggregated information display corresponding to the exemplary user profile in FIG. 3 is shown. Entries 500, 502 and 504 correspond to information obtained from the website for electronics company alpha, the BBC News™ website and the Twitter™ social networking media website, respectively. Entries 500, 502 and 504 also correspond to the option specified in the exemplary user profile shown in FIG. 3, searching for the alpha AX310 camera. In the example shown in FIG. 5, only electronics company alpha, BBC News™ and Twitter™ social networking media have information about the AX310 camera. Entry 506 corresponds to the option specifying searching for the BX510 software patch obtained from the community of interest information source. Electronics company beta may not have any information about the BX510 software patch insofar as electronics company beta may not yet have produced a patch.

Entry 508 corresponds to tracking the price of the Gucci™ coat. As illustrated in FIG. 5, the price of the coat did not drop below $800, and therefore, no alert is raised (i.e., that the price of the Gucci™ coat has dropped below $300 as specified in the exemplary user profile shown in FIG. 3). Entry 510 corresponds to corresponds to tracking the price of the AX310 Camera. Entry 512 corresponds to tracking the sale history for clothing company gamma.

Entry 514 corresponds to an alert for home insurance payment past due as specified in the exemplary user profile shown in FIG. 3A. No alert is shown for the price of the Gucci™ coat falling below $300 and the mortgage bill being due, insofar as none of these conditions have been met.

In FIG. 6, an exemplary aggregated information display corresponding to the exemplary user profile in FIG. 4 is shown. Entry 600 shows an alert for the computer company beta product launch insofar as the condition accompanying the alert is satisfied (i.e., the product has been launched), and the information source is the website for computer company beta. Entry 602 is also related to the option specifying the alert and accompanying condition computer company beta product launch, however entry 602 differs from entry 600 insofar as entry 602 displays information obtained from The Washington Post™ news website. Entry 604 includes tracked answers to the question "How do I fix blurry pictures?" As illustrated in FIG. 6, the Google™ group community of interest website changes between Jul. 1, 2010 and Jul. 15, 2010. On Jul. 15, 2010, the computer company beta releases an updated answer to the question on the company's frequently asked questions page.

In FIG. 7, an exemplary process flow diagram is shown. In step S700, a user profile is configured. The user profile is either configured automatically by the personal customer care agent or manually by the user. In one embodiment, the user profile is configured via a combination of automatic and manual methods. Either the personal customer care agent or the user configure at least one of the following sections of the user profile: entities, information sources, functions, options, customer fulfillment, interface and data presentation order. As will be discussed in further detail below, machine learning by the personal customer care agent may be used to automatically configure at least a portion of the user profile.

The process shown in FIG. 7 is performed for each option specified in the options section of the user profile, starting from step S702. The process shown in FIG. 7 is also repeated each time the user profile is updated, starting from step S702. The process proceeds to step S702 at which the current function is determined. If the current function is publish, then the process proceeds to step S703, at which information is published to one or more of the information sources based on the user profile.

If the current function is not publish, the process proceeds to step S704. Based on the user preferences specified in the user profile, the information sources are monitored and desired information (i.e., specified in the options section of the user profile) is obtained from information sources specified in the user profile in step S704. That is, the combination of function and argument/condition is used to obtain information from the information sources for search, question and answer, track and alert functions.

If it is determined that the current function is search, track, or question and answer, the process proceeds to step S706 at which the information from step S704 is aggregated and presented to the user based on a data presentation order specified in the user profile. If no data presentation order is specified, then the aggregated information is presented according to a random order. If the current function is track, the process returns, from step S706, to step S704 and the process is repeated from S704. If the current function is search or question and answer, the process proceeds from step S706 to step S710 at which it is determined whether the user profile has changed. If the user profile did not change, the process ends. If the user profile has changed, then the process returns to step S702.

Returning to step S704, if the current function is transaction mining, the process proceeds to step S708, in which transaction details are used in connection with information specified in the customer fulfillment section of the user profile. The process subsequently proceeds to step S710 at which it is determined whether the user profile has changed. If the user profile did not change, the process ends. If the user profile has changed, then the process returns to step S702.

If the current function is alert, the process proceeds to step S705 at which the condition accompanying the alert function is checked. If the condition is satisfied, the process proceeds to step S706 at which the aggregated information is presented to the user based on the data presentation order specified in the user profile. If no presentation order is specified, the aggregated information is presented according to a random order. If the condition is not specified, the process returns to step S704 at which the process restarts.

Figure 8:
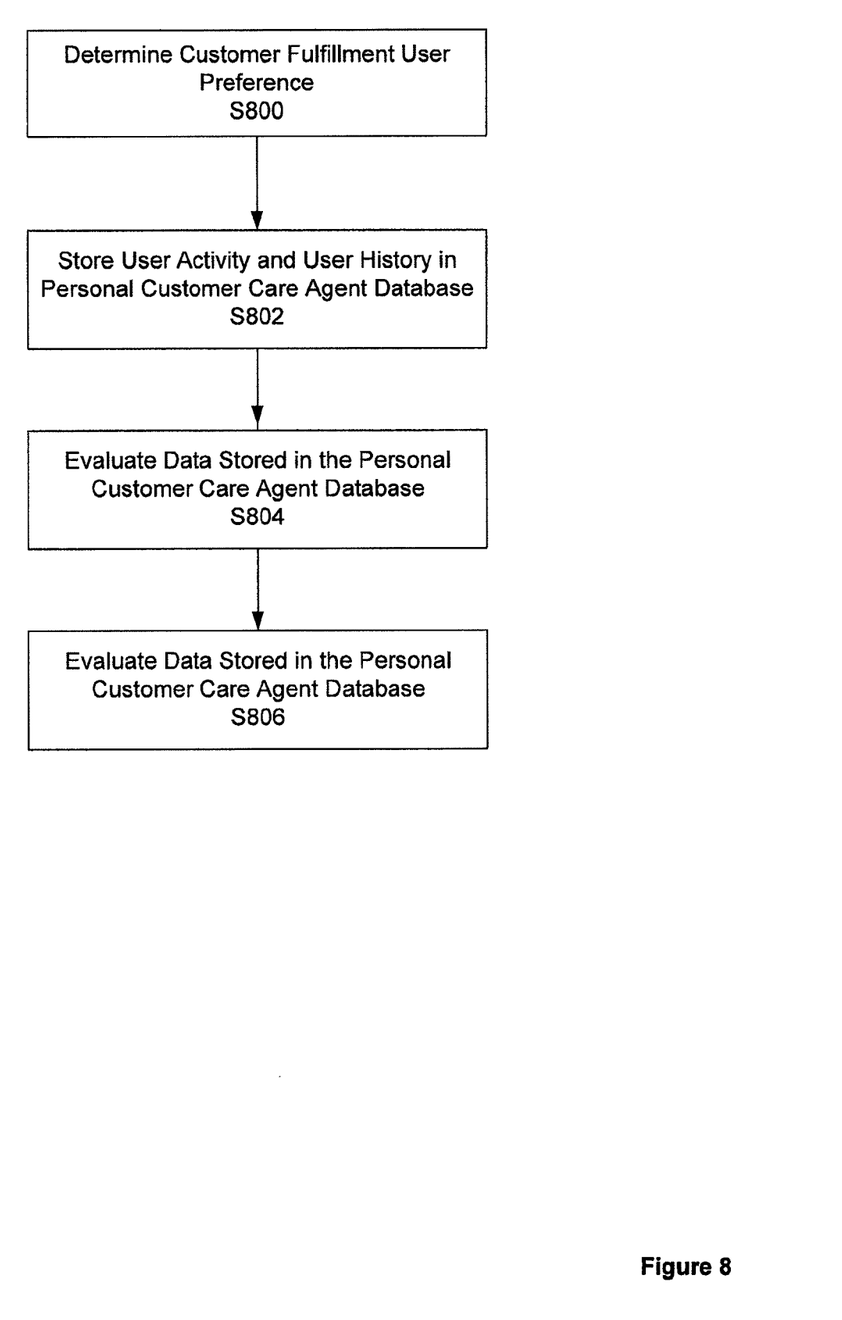
FIG. 8 shows an exemplary process flow diagram for implementing machine learning by the personal customer care agent.

In FIG. 8, an exemplary process flow diagram for implementing machine learning by the personal customer care agent is shown. The process starts at step S800 at which details of customer fulfillment section of the user profile are obtained. For example, it is determined whether user preferences indicate that the personal customer care agent machine learns any topics, or only alert topics, or any other limitation on the types of information learned by the personal customer care agent. In step S802, user activity and user history are stored, by the personal customer care agent, in a personal customer care agent database. User activity may include any of the following, but not limited to: searching, navigating, paying, reviewing and commenting activities. As will be understood by one of ordinary skill in the art, information regarding any number of user activities may be stored in the above-noted database. The personal customer care agent evaluates the information stored in the personal customer in step S806. In step S808, the personal customer care agent triggers an automatic update to the user profile.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, although the description herein references multiple individual computers, local area networks and application servers, the descriptions herein would be applicable to subsequent or equivalent systems in which multiple or even all applications are provided by one or more application servers in a cloud environment provided by a third party. Similarly, the descriptions herein would be applicable to subsequent or equivalent systems in which individuals in an entity are distributed worldwide and each of the applications described herein is provided by one or more than one centralized application servers.

As another example, the user, "Sally Q. Public" specifies the user profile shown in FIG. 3 which produces the aggregated information display shown in FIG. 5. The display shown in FIG. 5 is sent to Sally Q. Public on, for example, Jul. 30, 2010. Assuming a week has passed, and the current date is Aug. 7, 2010, the aggregated information display would include, in addition to entries 500, 502 and 504, messages related to efficacy and functioning of the AX310 camera. This may be due to the fact that a week has passed and users of the AX310 camera are starting to post reviews, comments and first impressions of the camera. These reviews, comments and first impressions may be obtained from social networking media websites, such as, for example, Facebook™ social networking media website insofar as electronics company alpha may not have had received enough user feedback to post any troubleshooting information or frequently asked questions and answers on the internet at alphaelectronics dot com. For example, Sally Q. Public may receive additional entries in the aggregated information for display on her AT&T Iphone™. Exemplary entries obtained from the Facebook™ information source include "AX310 Camera has a short battery life"; "I have to carry my battery pack everywhere I go!!!"; and "Wish the AX310 came with an additional battery pack :(".

Since the Facebook™ social networking media website information source includes additional information related to the searched for topic (e.g., the AX310 Camera) the new information is presented to Sally Q. Public. A similar process occurs for the track and alert functions.

Once the current date is Aug. 14, 2010, electronics company alpha may have received enough user feedback to add a webpage on the alpha electronics website (i.e., from the internet at alphaelectronics dot com) regarding troubleshooting information or rebate information. For example, electronics company alpha may have determined that the short battery life is due to a malfunctioning circuit. Therefore, electronics company alpha may have posted a rebate offer to buy an additional battery pack. The aggregated information presented to Sally Q. Public includes this new information. The aggregated information may be presented to Sally Q. Public in any order, since no order is specified in FIG. 3. In such case, Sally Q. Public is presented with information from the internet at alphaelectronics dot com, information from Google™ groups, and information from the Facebook™ social networking media website. Accordingly, Sally Q. Public is able to verify the correctness of the information posted on the Facebook™ by also reviewing information from electronics company alpha. That is, Sally Q. Public can verify the reliability of information she is being presented with, based on how many and which other information sources also present consistent information.

The personal customer care agent enables Sally Q. Public to post reviews and comments and prepare emails based on a searched for topic, that is, the AX310 camera. In one embodiment, the personal customer care agent pre-populates address fields for an email to a customer service agent for the alpha electronics company. In another embodiment, the personal customer care agent pre-populates a social media posting, e.g., a Facebook™ posting for the AX310 camera. In yet another embodiment, the personal customer care agent is configured to prompt Sally Q. Public to login to a social networking media website. In still another embodiment, the personal customer care agent waits a predetermined time period after displaying the aggregated information to perform pre-populating activities.

After Sally Q. Public is presented with various comments, reviews, postings and frequently asked questions and answers about the AX310 camera, she may wish to purchase an additional battery pack from electronics company upsilon instead of electronics company alpha, even though electronics company alpha is providing the rebate offer for the additional battery pack. While purchasing the additional battery pack for the AX310 camera, Sally Q. Public may also choose to purchase a camera case and possibly other camera accessories. Assume that the user profile shown in FIG. 3 also includes a machine learning preference in the customer fulfillment section of the user profile. Insofar as Sally Q. Public has chosen to purchase items from electronics company upsilon that are also available from electronics company alpha and insofar as the items purchased from electronics company upsilon are more expensive than the products offered by electronics company alpha, the personal customer care agent stores this information in the personal customer care agent database and "learns" that Sally Q. Public prefers electronics company upsilon, and adds electronics company upsilon as a user preference to the selected entities section of the user profile.

When Sally Q. Public is paying for her camera case and additional battery pack at the website for electronics company upsilon, transaction details specified as user preferences in the user profile are collected by the selected entity, i.e., electronics company upsilon. In one embodiment, the personal customer care agent also collects these transaction details. In another embodiment, the transaction details are obtained, by the personal customer care agent, from the selected entity. That is, electronics company upsilon sends the transaction details to the personal customer care agent. In the exemplary embodiment, transaction details collected for Sally Q. Public include any of the following, but not limited: credit card details, a shipping address, a shipping method and an alert type. The transaction details that may indicate that Sally Q. Public lives in Oyster Bay, N.Y. Accordingly, the personal customer care agent will present Sally Q. Public with various other cameras that are on sale within a predetermined distance (e.g., five miles) of her home. As another example, when the transaction details specify that Sally Q. Public is paying $45.78 for overnight shipping for her extra battery pack, the personal customer agent may present additional products of interest (e.g., a flash, a light meter, printing paper) that may make the overnight shipping costs "worth it" to Sally Q. Public.

Sally Q. Public may additionally choose to pay her cellular phone bill after she purchases the additional battery pack. While she is paying her cellular phone bill on the Internet, the customer care agent presents her with the option to pay her electric, sewage, water and telephone utility bills. That is, while she is navigating the cellular phone service company website, an additional graphical display of a selection is presented by the personal customer care agent. The personal customer care agent obtains utility bill information from each of the electric utility company, sewage utility company, water utility company and telephone company. In one embodiment, the personal customer care agent injects the utility bill information into the cellular phone service company webpage at the user device, i.e., without the knowledge or cooperation of the cellular phone service company. In another embodiment, the personal customer care agent sends the utility bill information to the cellular phone service company for incorporation.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for power over ethernet represent an example of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of aggregating information, comprising:
configuring and storing a user profile that indicates user preferences for aggregated information;
automatically monitoring over the internet, by a processor, specific external information sources among the World Wide Web, business websites of interest, and online social media, based on specific instructions in the user preferences to monitor the specific external information sources over the internet;
presenting data obtained from the external information sources based on the monitoring, in accordance with a presentation format, as the aggregated information, based on the user preferences and independent of preferences of the external information sources; and
triggering, by the processor, updating of the presented aggregated information based on a change to the data detected by the automatic monitoring of one of the external information sources.

2. The method according to claim 1, further comprising:
publishing user comments, based on the user preferences, to one of the external information sources.

3. The method according to claim 2,
wherein the user comments are converted from spoken comments to text using automated speech recognition.

4. The method according to claim 1,
wherein the user preferences specify a product, a service, and a business.

5. The method according to claim 1,
wherein the aggregated information comprises recalls, price fluctuations and troubleshooting information related to a product specified in the user preferences.

6. The method according to claim 1,
wherein the presentation format comprises a dashboard utility.

7. The method according to claim 1, further comprising:
obtaining transaction details for a user; and
using the transaction details to conduct an activity with respect to the external information sources.

8. The method according to claim 7,
wherein the activity is a user activity, and
wherein the user activity is purchasing a product.

9. The method according to claim 7,
wherein the activity is a user activity, and
wherein the user activity is paying a bill.

10. The method according to claim 7,
wherein the activity is a system activity, and
wherein the system activity is displaying a price incentive.

11. The method according to claim 1, further comprising:
automatically generating an email based on the user preferences.

12. The method according to claim 1, further comprising:
verifying the aggregated information based on consistency among the data.

13. The method according to claim 1, further comprising:
updating the user profile based on user activity information that is collected based on interaction with the external information sources.

14. The method according to claim 1,
wherein the user preferences specify the presentation format and search, track, question and answer, alert, transaction mining and publish functions.

15. The method according to claim 1,
wherein the user profile is updated automatically.

16. The method according to claim 1,
wherein the user profile is updated in real-time.

17. The method according to claim 1, further comprising:
answering a user query based on the aggregated information.

18. The method according to claim 1,
wherein the aggregated information is presented to the user via a mobile device.

19. A system for aggregating information, comprising:
a memory that stores executable instructions; and
a processor, implemented on a node of the system, that executes the executable instructions,
wherein the system configures and stores a user profile that indicates user preferences for aggregated information;
wherein the node automatically monitors over the internet specific external information sources among the World Wide Web, business websites of interest, and online social media, based on specific instructions in the user preferences to monitor the specific external information sources over the internet;
wherein the system presents data obtained from the external information sources based on the monitoring, in accordance with a presentation format, as the aggregated information, based on the user preferences and independent of preferences of the external information sources; and wherein the node triggers updating of the presented aggregated information based on a change to the data detected by the automatic monitoring of one of the external information sources.

20. A non-transitory computer readable medium that stores a set of executable instructions for aggregating information, the set of executable instructions directing a processor to perform acts comprising:

configuring and storing a user profile that indicates user preferences for aggregated information;

automatically monitoring over the internet, by the processor, specific external information sources among the World Wide Web, business websites of interest, and online social media, based on specific instructions in the user preferences to monitor the specific external information sources over the internet;

presenting data obtained from the external information sources based on the monitoring, in accordance with a presentation format, as the aggregated information, based on the user preferences and independent of preferences of the external information sources; and triggering, by the processor, updating of the presented aggregated information based on a change to the data detected by the automatic monitoring of one of the external information sources.

* * * * *